United States Patent
Booth

[15] 3,665,385
[45] May 23, 1972

[54] VEHICLE SEAT BELT WARNING SIGNAL SYSTEM

[72] Inventor: Frederick C. Booth, Birmingham, Mich.

[73] Assignee: Allied Chemical Corporation, New York, N.Y.

[22] Filed: Jan. 15, 1971

[21] Appl. No.: 106,822

[52] U.S. Cl.....................340/52 E, 307/10, 200/61.44
[51] Int. Cl..................................................B60r 21/10
[58] Field of Search.............340/52, 52 E, 278; 307/10; 200/61.4, 61.44

[56] References Cited

UNITED STATES PATENTS

| | | | |
|---|---|---|---|
| 3,340,523 | 9/1967 | Whitman | 340/52 X |
| 3,226,674 | 12/1965 | Eriksson | 340/53 |
| 3,368,197 | 2/1968 | Lemon | 340/52 |
| 3,504,336 | 3/1970 | Boblitz | 340/52 |
| 3,381,268 | 4/1968 | Boblitz | 340/52 |

*Primary Examiner*—Alvin H. Waring
*Attorney*—Marvin Bressler and Jonathan Plaut

[57] ABSTRACT

A seat belt warning signal, when initiated, indicates that one or more seat belts provided for vehicle occupant's use is not fastened about the occupant. A switch in the warning signal electrical circuit is biased in a first position. It is forced into a second position, initiating the signal, when a locking member, provided in the retractor assembly, is disposed in its non-locking position corresponding to full belt retraction. A timer is provided to initiate the signal if the bell is disposed in its unretracted position for a time longer than a reasonable driving period.

14 Claims, 2 Drawing Figures

Patented May 23, 1972 3,665,385

INVENTOR
FREDERICK C. BOOTH
BY
Maurn Bressler
ATTORNEY

3,665,385

VEHICLE SEAT BELT WARNING SIGNAL SYSTEM

BACKGROUND OF THE DISCLOSURE

The instant invention is directed to a seat belt warning signal. More specifically, the instant invention is directed to a warning signal provided with a biased switch which is activated when the seat belt is in the retracted position. Most specifically, the instant invention is directed to a warning signal provided with a switch, which is activated when the seat belt is in the retracted position and also provided with a timer which initiates the seat belt warning signal after a period of time longer than a reasonable driving period.

As is well known to expert and layman alike, seat belts provide excellent protection against serious injury in the event of a vehicle impact. However, seat belts must be fastened about the vehicle occupants to provide any protection at all. Oftentimes, occupants simply forget to fasten their seat belts. In other cases, the occupant realizes he has not fastened his seat belt, but because of the shortness of the trip or simply his annoyance with the effort involved in fastening his seat belt does not bother to take this step. In either case, a signal in the form of an illuminated light on the vehicle dashboard, or a buzzing sound indicating an unfastened seat belt may well have the effect of causing the errant occupant to fasten his seat belt. In the first instance, where one or more occupants merely forget to fasten their belts, a signal reminds them of this oversight. In the second case, where an occupant does not wish to bother to fasten his belt, the psychological effect of an illuminated light or a buzzing sound may well overcome this reluctance.

For the above mentioned reasons, it is generally agreed by those skilled in the art that a seat belt warning signal would be a useful and oftentimes important safety feature for the protection of the motor driving public. However, in the prior art, seat belt warning signals have suffered from significant defects. Probably the most important defect, in the prior art, is the lack of reliability of the warning signal systems employed. Typically, a warning signal is activated as a function of the rotation of the seat belt retractor. That is, the switch closing the circuit to activate the warning signal would close as a function of a number of revolutions of the seat belt retractor.

Another difficulty associated with the prior art warning signals is the ease with which an occupant can cheat the system. In the prior art, one merely need fasten the buckle of the seat belt and lodge it in the crease between the horizontal and vertical portions of the vehicle seat assembly to prevent activation of the warning signal. Alternately, an occupant can tie the belt attached to the retractor so as to prevent complete retraction. In either case, the effect is the same. The switch, in the warning signal electrical circuit, is disposed in the same position as if the belt were fastened about the occupant. Thus, the signal is not activated.

It should be apparent, from the above, that a warning signal which is more reliable and more foolproof than the warning signals of the prior art would serve a useful and significant role in the struggle for improved safety conditions on the nation's roads.

SUMMARY OF THE INVENTION

The instant invention is directed to a seat belt warning signal assembly which provides a reliable activating switch based on the disposition of the seat belt while at rest, either in the retracted or unwound, fastened position. The warning signal also is provided with means to prevent occupants from cheating, by maintaining the belt in a non-retracted position, at all times, without the belt being disposed about them.

The seat belt warning signal assembly of the instant invention is employed in combination with a type of seat belt retractor assembly most often used in vehicles today. In this assembly a retractor support is connected to the vehicle. A reel is rotatably mounted on the support and a belt is connected to the reel. The belt is extended when the reel is rotated in an unwinding direction and is retracted as to the reel is rotated in the opposite, winding direction. The seat belt assembly also includes a locking member movably mounted on the support for motion between a locking position, to prevent the seat belt from moving in the unwinding direction, and a second position to allow seat belt movement in the unwinding direction.

In accordance with the instant invention, a seat belt warning signal system is provided in a vehicle. The warning signal is preferably a warning light or warning buzzer in electrical communication with the ignition switch of the vehicle. An electrical switch, connected to a retractor support, and in communication with a locking member on the retractor is also in electrical communication with the warning light or buzzer. The electrical switch is biased in a first position, which corresponds to the position in which the warning signal is not normally activated. The warning light is illuminated, or the warning buzzer sounded, by the action of the locking member disposed in its second position which allows for seat belt unwinding. The locking member pushes the electrical switch arm to its second position, against the bias, which corresponds to the position of the switch activating the warning signal.

The seat belt warning signal system of the instant invention is also provided with a time delay means. A timing device, which constitutes the time delay means, is reset upon unwinding of the belt from the retracted position. The timing device activates the warning signal, to which it is in electrical communication, unless it is reset within the time period before the timing switch of the timing device closes.

BRIEF DESCRIPTION OF THE DRAWINGS

The instant invention may be understood by reference to the accompanying drawings of which.

DETAILED DESCRIPTION

Figure 1:
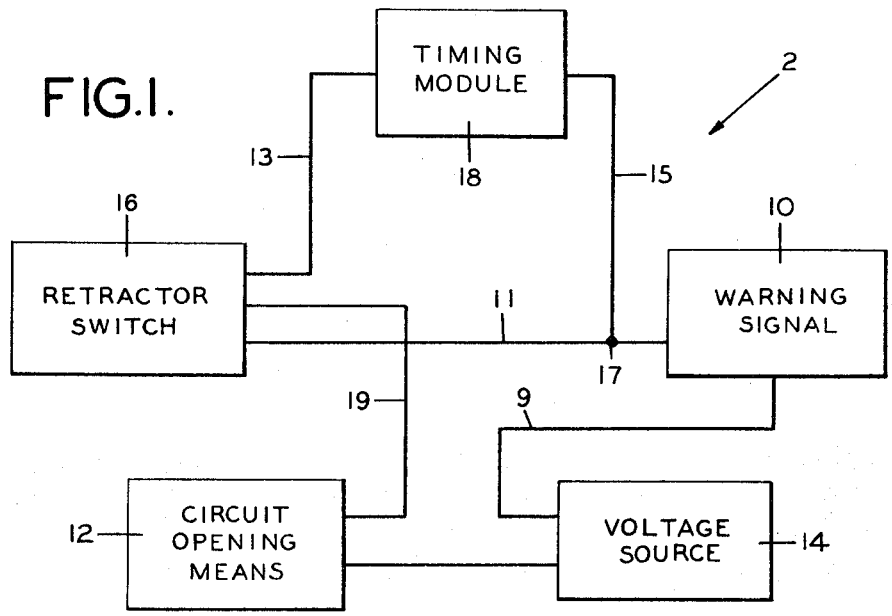
FIG. 1 is a block diagram of the electrical system of the instant invention.

Turning to FIG. 1 in detail, the warning signal electrical circuit is generally indicated at 2. The circuit 2 includes a warning signal 10. In a preferred embodiment, the warning signal 10 takes the form of a warning light disposed in the dashboard of the vehicle. In a second preferred embodiment, the warning signal 10 is a buzzer disposed in the passenger compartment of the vehicle. The electrical circuit 2 also includes a circuit opening means 12. The circuit opening means 12, in one preferred embodiment, comprises the vehicle ignition switch. By including the vehicle ignition switch 12 in the warning signal circuit 2 the possibility of the warning signal 10 remaining activated during non-operation of the vehicle is prevented. Alternately, in another preferred embodiment, the circuit opening means 12 comprises opening of the circuit 2 upon engagement of the vehicle transmission in a neutral position. In this embodiment the warning signal remains inactivated even while the vehicle engine operates. This permits disconnecting of one or more seat belts while a vehicle is stopped with the engine running. As FIG. 1 clearly illustrates, the circuit 2 is always opened when the circuit opening means 12 is opened.

The circuit 2 is powered by a voltage source 14. In a preferred embodiment, the vehicle battery is employed to power the circuit 12. Thus, in a preferred embodiment the voltage source 14 comprises a standard 12 volt DC storage battery. It should be appreciated that a separate volt source may alternatively be employed.

An important component of the warning signal circuit 2 is a retractor switch 16. The switch 16, which will be described in greater detail hereinafter, is provided with three terminals. Thus, the switch 16 may operate in one of two positions. When the retractor switch 16 is in a first position, a signal is transmitted through electrical conduit 13 to a timing module 18. The signal to the module 18 initiates a timing switch (not shown). The signal, however, is terminated and does not reach the warning signal 10. Thus, the warning signal does not go on. After a fixed preset period of time after initiation of the timing switch, disposed in the timing module 18, the switch closes, sending a signal by way of electrical conduit 15 to the warning signal 10. Electrical conduit 15 is connected to an electrical conduit 11, at junction point 17. Since conduit 11 communicates with the warning signal 10, the signal 10 is activated. The retractor switch 16, when disposed in the second position, is in electrical communication with electrical conduit 11. Electrical conduit 11 is direct communication with the warning signal 10. Thus, a signal generated by the switch 16 immediately illuminates the warning light or sounds the buzzer. The first and second position of the retractor switch 16 provides parallel branches between the switch 16 and the warning signal 10. It is obvious that only one of these two branches can be activated at any one time.

A second electrical line must connect the switch 16 to the warning signal 10 in order to complete the electrical circuit 2. This second line between the retractor switch 16 and the warning signal 10 is provided by electrical conduit 19. The electrical conduit 19 includes the circuit opening means 12 and the voltage source 14 connected thereto in series. The switch 16 is designed so that there is always communication between the signal 10 and the switch 16 by way of conduit 19, subject, of course, to interruptions due to openings of the circuit opening means 12, when the vehicle is not operated, or when the transmission is in a neutral position.

Figure 2:
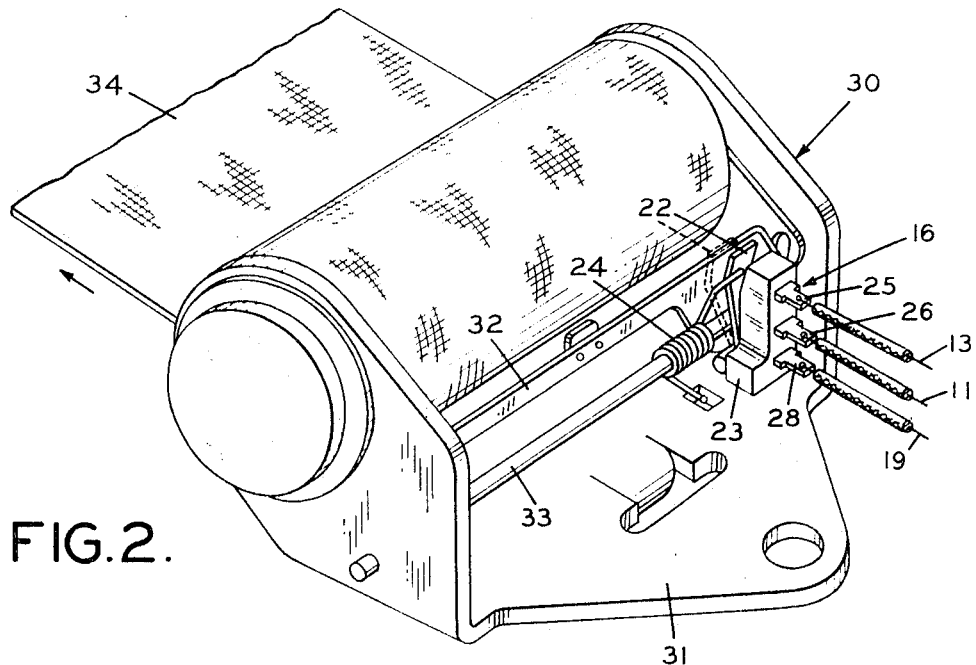
FIG. 2 is a perspective view of the retractor switch of the instant invention connected to a seat belt retracting assembly.

Turning now to a more detailed description of the retractor switch 16 of the instant invention, reference is made to FIG. 2. In FIG. 2 a typical seat belt retracting reel assembly 30 is shown provided with the retractor switch 16 of the instant invention. The switch 16 is connected to a reel assembly 30 by means of a shaft 33 which is disposed in the assembly support 31. The connection between the switch 16 and the assembly 30 is made by a spring 24 disposed about the shaft 33. The spring 24 is connected to an arm 22 of the switch 16. The spring 24 provides a biasing means urging the arm 22 to a position away from the body portion 23 of the switch 16. This position of the arm 22 away from the body portion 23 of the retractor switch 16 places the switch 16 in its first position. This position is indicated in FIG. 2 by the dotted line position of the arm 22. The reel assembly 30 is also provided with a locking member 32 which forces the arm 22 toward the body portion 23, thereby disposing the switch in its second position, when the seat belt 34 is in its fully retracted position.

The retractor switch 16 is provided with three prongs which connect to the three electrical conduits in communication with the retractor switch 16. Prongs 25 and 26 are connected to electrical conduits 13 and 11 respectively. Prong 28 connects the switch 16 to the electrical conduit 19 which is in communication with the circuit opening means 12 and the voltage source 14.

The seat belt warning signal assembly is activated when the switch comprising the circuit opening means 12 is closed. This occurs, depending upon the preferred embodiment employed, when the ignition switch is closed, or thereafter, when the transmission is shifted into a moving gear. The closing of the circuit opening means 12 completes the circuit 2 by providing electrical communication between the retractor switch 16 and the warning signal 10. As FIG. 1 clearly indicates, electrical conduits 19 and 9 provide electrical communication between the retractor switch 16 and the warning signal 10 when the circuit opening means 12 is closed. It should be appreciated that the electrical circuit 2 is completed since a second electrical line connecting the signal 10 to the retractor switch 16 is always provided by either conduit 11 or by conduit 13-15-11.

If an occupant of the vehicle does not fasten his seat belt 34, the seat belt 34 will be in the fully retracted position. In this position, the locking member 32 is in its second position which allows for reel rotation. In this position the locking member 32 pushes against the arm 22 of the switch 16 against the bias created by the spring 24, forcing arm 22 toward the body portion 23 of the switch 16. This disposition of the arm 22 places the retractor switch in its second position. In the second position, an electrical circuit starting at switch 16, continuing through conduit 11, to the warning signal 10 and back through electrical conduits 9 and 19 is completed. Thus, the warning signal 10 is activated. Illumination of the light, or sounding of the buzzer, warns the occupants of the vehicle that they have neglected to fasten one or more seat belts.

On the other hand, if prior to starting the engine, the occupants of the vehicle fasten their seat belts, the belt 34 is unwound from the reel and buckled to a second seat belt member (not shown). As those skilled in the art are aware, the purpose of the locking member 32 is to prevent further unwinding of the seat belt 34. Without describing the retractor assembly 30 in detail, when the seat belt 34 is unwound a pair of rachet wheels (not shown) direct the member 32 against the seat belt 34 remaining on the reel preventing further unwinding of the belt 34. Because of the disposition of the teeth of the rachet wheels (not shown) retraction is always permitted. Thus, in the unwound position, the locking member 32 engages the belt 34 remaining on the reel. In order for the locking member 32 to engage the seat belt 34 on the reel, it must move forward. As the locking member 32 moves forward it moves away from the arm 22, the arm 22 moves forward also under the urging of the biasing means, the spring 24. Thus, the arm 22 moves to the position indicated by the dotted lines. For convenience, this position is designated the first position of the arm 22 to correspond to the first position of the switch 16. In this position there is electrical communication between the switch 16 by way of the electrical conduit 13, the timing module 18, the electrical conduit 15 and conduit 11 to the signal 10. The timing module 18, as stated above, interrupts the signal from the switch 16 to the switch 10. However, the signal activates a timing switch disposed in the module 18. This signal is sent as soon as the seat belt 34 is unwound a sufficient distance so that the locking member 32 moves to engage the belt 34 still on the reel. The distance the belt 34 need be unwound to activate the signal by way of conduit 13 to the module 18 is very short, and nowhere near the distance the belt 34 need be unwound to be fastened to the occupant. After a preset period of time, subsequent to activation, the timing switch in the timing module 18 closes. This completes the circuit so that a signal from the retractor switch 16 continues by way of conduit 15 to junction 17 and thereafter through conduit 11 to the warning signal 10 whereby the signal 10 is activated.

By providing a timing module 18, in electrical communication with the switch 16, latching of the belt without fastening it around the occupant is prevented. In the prior art, there has been no system to prevent occupants from unwinding the belt, such as that illustrated at 34, and maintaining the belt in its unwound position permanently. As the instant invention illustrates, without a timing device, a seat belt could be unwound and maintained permanently in the unwound position, without the occupant fastening the belt without activation of a warning signal. By designing the system so that a time period is fixed from initial unwinding of the belt 34 such a scheme is thwarted. In the operation of the instant invention, an occupant who unwinds the belt 34 and buckles it to the accompanying belt, thereafter disposing the buckled belt in the crease between the horizontal and vertical cushions of the seat assembly, or alternatively, if an occupant unwinds the belt 34 and knots it so that it cannot be retracted, the timing switch of the timing module 10 is activated. After the preset period of time, the timing switch is closed and the warning signal 10 is activated.

It should be appreciated that the timing module 10 represents a separate circuit. Thus, starting and stopping of the vehicle, that is closing and opening of the circuit opening means 12, in no way effects the action of the module 18. In order to reset the timing module 18, the belt 34 must be fully retracted and thereafter unwound again. Upon unwinding a second time, the timing switch of the module 18 is reset. The only way one can prevent the timing switch from activating the warning signal 10 is for the seat belt 34 to be retracted within the time period set for closing of the timing switch. If, in the unlikely event, an occupant remains in the vehicle with his seat belt fastened for a period in excess of the time set in the module 18, he need simply unfasten the belt so that the belt 34 is retracted and thereafter refasten the belt which automatically resets the timing mechanism. In a preferred embodiment, the time is set at 6 hours. It is been found that most drivers and passengers do not remain seated in a vehicle at any one time for longer than 6 hours. The slight inconvenience to an occupant remaining seated in a vehicle for longer than 6 hours is more than made up for by the beneficial effects of this system.

The preferred embodiment described above illustrates, but does not limit, the scope and spirit of the instant invention. Other embodiments incorporating the basic invention herein described are within the scope of the instant invention as defined by the claims below. Thus, incorporation in the instant invention of a plurality of pressure sensitive devices disposed in the horizontal cushion of the seat assembly may be provided. As many of these pressure sensitive devices are provided as the number of occupants the vehicle is designed to accommodate. If these seats are unoccupied, that seat belt retractor position is cut out of the circuit. Hence, the warning signal is not activated for retracted seat belts which are unoccupied. The scope of the instant invention should, therefore, be limited only by the appended claims.

What is claimed is:

1. In a vehicle seat belt assembly provided with a reel rotatably mounted on a support, a belt connected to the reel so as to be extended when the reel is rotated in an unwinding direction and to be retracted as the reel is rotated in the opposite, winding direction, a locking member movably mounted on the support for motion between a locking position to prevent reel rotation in the unwinding direction and a second position to allow reel rotation, the improvement comprising: an electrical warning signal circuit including a warning signal in electrical communication with a circuit opening means; an electrical switch connected to said support and for movement thereof in communication with said locking member, said switch biased in a first position in which said warning signal is not activated, and movable by engagement with said locking member, into a second position to activate said warning signal when said locking member is in said second position.

2. An improved assembly in accordance with claim 1 wherein said electrical switch is in electrical communication with said warning switch by means of a first and second electrical conduit, said first conduit connected in series with a voltage source means and said circuit opening means.

3. An improved system in accordance with claim 2 wherein said electrical switch is connected to said warning signal by said second electrical conduit, said second conduit provided with parallel first and second branches, said first branch, communicating between said switch and said warning signal, is activated when said locking member is in said second position.

4. An improved system in accordance with claim 3 wherein said second branch is activated when said locking member is in said locking position to prevent reel rotation in the unwinding position, said second branch provided with a timing module which interrupts electrical communication between said electrical switch and said warning signal for a fixed period of time whereby said electrical circuit is not completed and said signal is not activated during said fixed period of time.

5. An improved assembly in accordance with claim 1 wherein said circuit opening means comprises the ignition switch of said vehicle, whereby said electrical signal circuit is inactivated when said ignition switch is open and said vehicle is not operating.

6. An improved assembly in accordance with claim 1 wherein said circuit opening means comprises engagement of the transmission of said operating vehicle in a moving gear, whereby said electrical signal circuit is inactivated when said vehicle is not moving.

7. In a vehicle, provided with seat belts disposed on retractable reels, a seat belt warning signal assembly comprising: a warning signal provided with a first and a second electrical conduit; a voltage source means disposed in series with said first electrical conduit; an electrical switch, connected to said retracting reel and in electrical communication with said warning signal by said first and second electrical conduits to provide an electrical circuit, said switch provided with first and second switching positions communicating with alternate first and second electrical branches which comprise said second electrical conduit; a time delay means, disposed in said first electrical branch of said second electrical conduit, which interrupts electrical communication between said warning signal and said electrical switch to prevent activation of said signal, said time delay means comprises a time delay switch activated when said electrical switch moves from said first to said second position, and said time delay switch interrupts electrical communication between said warning signal and said electrical switch when said electrical switch is in said second position whereby said warning signal is not activated for a pre-set period of time, measured from activation of said time delay switch by the movement of said electrical switch from said first to said second position, after which time said time delay switch closes, completing said electrical circuit and activating said warning signal.

8. An assembly in accordance with claim 7 wherein said warning signal is a light disposed on the dashboard of said vehicle, which is illuminated upon activation.

9. An assembly in accordance with claim 7 wherein said warning signal is a buzzer, which is sounded upon activation.

10. A seat belt warning signal assembly comprising: a seat belt connected to a supported retractable reel provided with a locking member which engages said belt when said belt is unwound and disengages said belt when said belt is retracted; an electrical switch, connected to said reel support, capable of being disposed in a first and a second switching position, said switch provided with a spring biased arm which urges said arm into a first position corresponding to said first switching position, and movable into said second position, against the urging of said spring bias, when said locking member is disengaged from said seat belt; a first electrical conduit connected to said electrical switch; a second electrical conduit comprising first and second parallel electrical paths each connected to said electrical switch, said electrical switch communicates with said first path when said switch is in said first position, and communicates with said second path when said electrical switch is in said second position; a warning signal connected to said electrical switch by said first and said second electrical conduits providing a complete electrical circuit; a voltage source connected in series to said first electrical conduit between said switch and said warning light to activate said electrical conduit; means to interrupt electrical communication between said switch and said warning light, said means disposed in said first parallel path of said second electrical conduit whereby said warning signal is not activated when said switch is in said first position; said means to interrupt electrical communication between said electrical switch and said warning signal comprises a time delay means which is activated upon switching of said electrical switch to said first position, said time delay means set to complete electrical communication between said switch and said signal to activate said signal after a preset period of time unless said time delay means is reset within said period of time, and said time delay means is reset only when said electrical switch moves from said second position to said first position.

11. An assembly in accordance with claim 10 wherein said preset period of time is six hours.

12. An assembly in accordance with claim 10 wherein the vehicle ignition switch is connected in series to said first electrical conduit, between said warning signal and said electrical switch, whereby said electrical circuit is completed only when said vehicle ignition switch is closed.

13. An assembly in accordance with claim 10 wherein the vehicle ignition switch and the transmission of the vehicle is connected in series to said first electrical conduit, between said warning signal and said electrical switch, whereby said electrical circuit is completed only when said vehicle ignition switch is closed and said transmission is engaged in a moving gear.

14. An assembly in accordance with claim 10 wherein said voltage source connected in series in said first electrical conduit comprises at 12 volt DC storage battery.

* * * * *